United States Patent
Ishida et al.

[15] 3,696,170
[45] Oct. 3, 1972

[54] STABILIZED POLYMER COMPOSITIONS

[72] Inventors: Shinichi Ishida, Tokyo; Nobumitsu Yano, Noboru Ohshima, both of Irumagun, Saitama-ken; Hiromichi Eukuda, Takeshi Sato, both of Tokyo, all of Japan

[73] Assignee: Asahi Kasei Kogyo Kabushiki Kaisha, Osaka, Japan

[22] Filed: June 3, 1969

[21] Appl. No.: 830,114

[30] Foreign Application Priority Data

June 4, 1968  Japan ......................43/37878

[52] U.S. Cl............260/858, 260/857 F, 260/857 L, 260/857 D, 260/45.8 N, 260/45.9 P, 260/45.9 R, 260/45.95
[51] Int. Cl. ........................C08f 45/60, C08g 51/60
[58] Field of Search ....260/45.8 N, 45.8 NO, 45.8 O, 260/251, 211.5, 857 F, 857 L, 857 D, 858

[56] References Cited

UNITED STATES PATENTS

| Patent No. | Date | Inventor | Class |
|---|---|---|---|
| 3,574,786 | 4/1971 | Ishida et al. | 260/857 |
| 3,277,045 | 10/1966 | Bonvicini et al. | 260/45.8 |
| 3,281,392 | 10/1966 | Oddo et al. | 260/45.8 |
| 3,297,627 | 1/1967 | Hermann et al. | 260/45.8 |
| 3,313,767 | 4/1967 | Berardinelli et al. | 260/45.8 |
| 3,394,102 | 7/1968 | Wakasa et al. | 260/45.8 |
| 3,436,362 | 4/1969 | Hayer et al. | 260/23.7 |
| 3,346,561 | 10/1967 | Boxer et al. | 260/211.5 |
| 3,451,997 | 6/1969 | Fujimoto | 260/211.5 |
| 3,491,085 | 1/1970 | Cook et al. | 260/211.5 |
| 3,505,280 | 4/1970 | Hermann et al. | 260/45.8 |
| 3,516,985 | 6/1970 | Walton et al. | 260/211.5 |
| 3,542,729 | 11/1970 | Murayama et al. | 260/45.8 |

OTHER PUBLICATIONS

Kokko et al., " Journal of the American Chemical Society," Vol. 83, 1961, Pages 2,909– 2,911, QD1A5C2.

*Primary Examiner*—Donald E. Czaja
*Assistant Examiner*—R. A. White
*Attorney*—Burgess, Dinklage & Sprung

[57] ABSTRACT

Various polymers, such as polyacetal, polyolefine, polydiolefine, polyamide, polyurethane polyester, polyether, polyvinyl and polyhaloolefine are stabilized against heat, light and oxygen by adding thereto at least one pyrimidine base such as cytosine, cytidine and uracil.

14 Claims, No Drawings

STABILIZED POLYMER COMPOSITIONS

This invention relates to stabilized polymer compositions. More specifically, this invention relates to stabilized polymer composition which contains at least one pyrimidine base. In general, organic polymers, when exposed to air and/or ultraviolet ray, tend to be oxidized and thereby deteriorated or degraded. Ozone gas works to deteriorate most of polymers and heat also is likely to catalyze the oxidative deterioration and decomposition of the polymers.

Especially, polymers such as polyacetal diolefinic synthetic rubbers, polyolefines, vinyl chloride polymer and copolymers, polyamides, polyurethanes and polyalkyleneoxides are susceptible to deterioration by heat and/or light. These polymers have usually been made resistant to such deterioration or degradation by adding thereto a small amount of various antioxidants and/or degradation inhibitors.

For this purpose, in general, phenol compounds and aromatic secondary amino compounds have been used.

It is known that phenol compounds, when incorporated into polymer material, discolor polymer material. Further phenol compounds can not effectively stabilize polyamides and polyurethanes. Especially, bisphenols themselves become discolored by the action of air and heat.

As for aromatic secondary amino compounds, they are widely used with notable thermal stabilizing effect, but they also will cause discoloration of polymer materials when they are incorporated into polymer materials.

In our pending U.S. Pat. Application, Ser. No. 803,504, filed on Feb. 27, 1969, now U.S. Pat. No. 3,591,521 it is disclosed that 5-aminouracil or 5-aminocytosine represented by general formulas

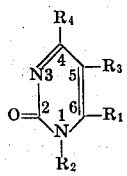

stabilizes the organic materials against acidic degradation and/or ultraviolet ray degradation.

The present inventors have further made researches on more effective stabilizers and found that cytosine, its derivatives, uracil and its derivatives other than said 5-aminouracil and 5-aminocytosine inhibit deterioration caused by heat, air and light. 5-amino uracil, 5-aminocytosin and their derivatives are good stabilizers for low molecular weight material, such as fats, gasoline, lard and vitamin but their stabilizing effects on high molecular material, namely polymer material, are not satisfactory. Especially the use of 5-amino uracil, 5-aminocytosine and their derivatives are not recommended on the polymer materials which tend to be discolored by light.

Since in many cases polymer materials are commonly used in the circumstances where they are exposed to light, especially U.V. ray, for a prolonged period, discoloration of them provides serious problems and should be avoided as much as possible It has been proved that polymer composition containing 5-amino cytosine or their derivatives become discolored in some 50 hour exposure to U.V. ray, which is shown in one of the examples of the present invention.

It is therefore an object of this invention to provide polymer compositions which are stable over a long period against light, heat, and/or oxygen.

Other and additional objects of this invention will become apparent from a consideration of this entire specification, including the claims thereof.

In accordance with these objects, polymers are stabilized against such deterioration as caused by exposure to air, light and/or heat by adding thereto at least one pyrimidine base represented by a general formula

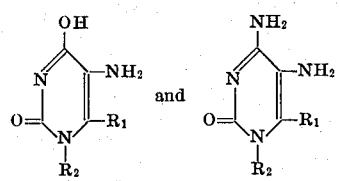

respectively in which, $R_1$ is a member selected from the group consisting of hydrogen atom, hydroxyl, amino and alkyl of one to 18 carbon atoms; $R_2$ is a member selected from the group consisting of hydrogen atom, alkyl of one to 18 carbon atoms and monosaccharide of five to six membered ring such as glucosyl, xylosyl and ribosyl and alkyl or acetyl-substituted monosaccharide of five to six membered ring; $R_3$ is a member selected from the group consisting of hydrogen atom and alkyl of one to 18 carbon atoms; $R_4$ is a member selected from the group consisting of amino and hydroxyl: in case $R_4$ is hydroxyl, $R_2$ is a member selected from the group consisting of alkyl of one to 18 carbon atoms and monosaccharide of five to six membered ring such as glucosyl, xylosyl and ribosyl and alkyl- or acetyl- substituted monosaccharide of five to six carbon atoms, and $R_1$ and $R_3$ are as defined above.

The pyrimidine bases represented by the above formula are usually called cytosine (4-amino-2(1H)-pyrimidone), uracile(4-hydroxy-2-(1H)pyrimidone) and their derivatives.

The pyrimidine bases being non-toxic, the uses thereof are not limited.

Although, the pyrimidine bases can be synthesized, they may be easily obtained by chemical decomposition of natural occurring nucleic acids.

The examples of pyrimidine bases of the present invention may include;
Cytosine(4-amino-2-(1H)-pyrimidone), cytidine(1-ribosyl-2-keto-4-amino-pyrimidine), 1-xylosyl-2-keto-4-amino-pyrimidine, 1-glucosyl-2-keto-4-amino-pyrimidine, 1-(2,3,5-triacetyl ribosyl)-2-keto-4-amino-pyrimidine, 1-(2,3-isopropylidene ribosyl)-2-keto-4-amino-pyrimidine, 1-ribosyl-2-keto-4-amino-5-methyl-pyrimidine, uridine(1-ribosyl-2-keto-44-hydroxyl-pyrimidine), thymidine(1-ribosyl-2-keto-4-hydroxyl-5-methyl-pyrimidine), 1-glucosyl-2-keto-4-hydroxyl-pyrimidine, 1-glucosyl-2-keto-4-hydroxyl-pyrimidine, 1-glucosyl-2-keto-4-hydroxyl-5-methyl-pyrimidine.

As polymers, there may be mentioned polyolefins, polydiolefines, polyalkylene oxides, polyamide, polyurethanes, polyesters, polyethers, polythioethers, polyvinyl compounds, polyhaloolefines, polyacetals and their copolymers.

Especially, the pyrimidine bases of the present invention are effective to polyoxymethylene diacetate, polyoxymethylene diether, and copolyoxymethylene having in its main chain and terminal positions other unit such as oxyethylene, which are more easily discolored with light than other polymer material.

It is to be noted that, the polymer compositions containing pyrimidine bases of the present invention exhibit remarkable light resistance over a long period i.e., the appearance of the polymer compositions, does not change even after 200 hour exposure to U.V. ray, while those containing conventional stabilizers such as 5-amino uracil, 5-amino cytosine and their derivatives become yellow in as early as 50 hours.

This light resistance of the polymer composition especially, over a long period being required to a greater extent, above stabilizing effect against light is highly estimated.

The pyrimidine bases themselves are stable to heat, lights, acids alkalis, and can be employed in combination with other anti-oxidants, preservatives, plasticizers stabilizers, vulcanization-accelerators, fillers, antistatics, dyes, pigments and other common additives, in some circumstances, exhibiting so called synergistic effects. The amount of said additives may range from 0.001 to 10 percent by weight based on polymer material. Preferred combinations are those of (1) at least one of pyrimidine bases of the present invention, (2) at least one of phenol compounds and (3) at least one of nitrogen-containing compounds such as polyamides, copolyamides, polyesteramides, dicarboxylic acid dihydrazide-urea-diamine-condensate and dicyandiamide, giving so called synergistic effect as embodied in examples.

Although a very small amount of the pyrimidine bases, even as low as 0.001 percent by weight based on the polymer, can be effective, the preferred amount of the pyrimidine bases ranges from 0.01 to 5 percent by weight based on the polymer. The upper limit of the amount set forth is determined by economic considerations and operational parameters, and is not an operative limitation.

Therefore, although the polymer can be effectively stabilized with 10 percent or more by weight of the pyrimidine bases based on the polymer, the use of such a greater amount of them is usually not economically attractive.

The pyrimidine bases of the present invention may be incorporated into polymers in any operable method and at any time in the course of processing and preparation of the polymers, or it may be added to, applied to or dipped into the produced polymer.

The feature of the present invention can more fully be understood by the following non-limiting illustrative examples.

In each example, % is % by weight based on the weight of polymer material, unless otherwise expressed.

EXAMPLES 1-16

(Stabilization of polyacetal)

To 1 kg. of polyoxymethylene diacetate (abbreviated to POMD hereinafter) obtained by the polymerization of formaldehyde and the subsequent acetylation with acetic anhydride and having intrinsic viscosity 2.00 as measured at 60° C. in a mixture solution of equal amount of tetrachloroethane and p-chlorophenol, was added cytidine (cytosine riboside) or uridine (uracil riboside) at amount specified in Table 1 to prepare polymer compositions. The composition was throughly mixed and the thermostability and light-resistance of the composition were measured. Comparative test To 1 kg. of POMD as identified above, there was added as a thermal stabilizer, at least one of copolyamides, polyaminotriazole, urea, diphenylamine, urea-adipic acid dihydrazide-hexamethylene diamine — condensate and pyrimidine bases to prepare polymer composition. The composition was thoroughly mixed. The measurement of the thermal stability and light resistance by means of Fade-o-Meter was conducted. The results are shown in Table 1. In each example, 0.2 percent of 2,2'-methylene-bis(4-methyl-6-tert-butyl-phenol) was contained in the composition.

TABLE 1

| Ex. Nos. | Additives | Amount added (%)[1] | R (%)[2] | S(ml./g.)[3] | Z Value[4] | Light resistance[5] |
|---|---|---|---|---|---|---|
| 1 | Urea | 2.0 | 94.3 | very large | 80 | discolored |
| 2 | 1,(2,3,5-triacetyl ribosyl)-2-keto-4-amino-pyrimidine | 0.5 | 98.9 | 14 | 98 | not changed |
| 3 | Cytidine(cytosine riboside) | 0.5 | 99.0 | 13 | 98 | - do - |
| 4 | Uridine (uracil riboside) | 0.5 | 99.0 | 13 | 98 | not changed |
| 5 | Copolyamdie of hexamethylene-adipamide, hexamethylene sebacamide and caprolactam | 2.0 | 97.50 | 100 | 95 | slightly discolored |
| 6 | Polyaminotriazole prepared from sebacic acid hydrazide | 2.0 | 96.21 | 142 | 90 | - do - |
| 7 | Urea-adipic acid dihydrazide-hexamethylene diamine-condensate[6] | 1.0 | 99.1 | 12 | 98 | not changed |
| 8 | Diphenylamine | 0.5 | 82.0 | very large | 85 | dark brown |
| 9 | Copolyamide of hexamethylene adipamide, hexamethylene sebacamide and caprolactam and Diphenyl amine | 2.0<br>0.1 | 98.0 | 80 | 95 | - do - |
| 10 | Polyaminotriazole prepared from sebacic acid hydrazide and Diphenyl amine | 2.0<br>0.1 | 97.3 | 120 | 87 | - do - |
| 11 | Urea-adipic acid dihydrazide-hexamethylene-diamine condensate[6] and Diphenyl amine | 1.0<br>0.1 | 99.2 | 11 | 98 | - do - |
| 12 | Copolyamide of hexamethylene adipamide, hexamethylene sebacamide and caprolactam and Cytidine (cytosine riboside) | 2.0<br>0.1 | 98.70 | 17 | 97 | not changed |
| 13 | Polyaminotriazole prepared from sebacic acid hydrazide and Cytidine (Cytosine riboside) | 2.0<br>0.1 | 97.6 | 90 | 89 | slight discoloration observed |
| 14 | Urea-adipic acid dihydrazide-hexamethylene diamine-condensate[6] and | 1.0 | 99.3 | 8 | 99 | not changed |

| | | | | |
|---|---|---|---|---|
| Cytidine (cytosine riboside) | 0.1 | | | |
| 15 Urea-adipic acid dihydrazide-hexamethylene diamine-condensate[6] and Uridine (uracil riboside) | 1.0<br><br>99.3<br><br>0.1 | 8 | 99 | -do- |
| 16 No additives | 0 70 | very large | 95 | slightly discolored |

Note: [1]% is % by weight based on the weight of polyoxymethylene diacetate
[2]R (%) is percentage of residue after heat-treating the polymer composition at 220°C. in the air for 60 minutes.
[3]S (ml./g.) is amount of gas generated in terms of ml. per gram of the polymer composition after heat-treating the same at 220°C. in a hypodermic syringe
[4]Z value represents the whiteness measured by means of Hunter colorimeter, of a 3 mm. thick plate injection-molded at 190°C. of each composition.
[5]Light resistance was measured for the sample plate as formed above, by means of Fade-O-meter and was indicated by the appearance of the plate after 192 hours exposure to light.
[6]This condensate is disclosed in U.S. Patent Application Serial. No. 785599, now Patent 3,574,786.

From the results shown in Table 1, it is evident that both cytidine and uridine can afford to POMD remarkable resistance against heat and ultraviolet ray, giving thermal stabilized and light-stabilized polyoxymethylene composition.

It is further noted that the use of polyamide or urea-adipic acid dihydrazide-hexamethylene diamine condensate in conjunction with the pyrimidine base of the present invention exhibited remarkable synergistic effect on POMD.

EXAMPLE 17

(Stabilization of Polyacetal)

A 1 l. three-necked flask was charged with a mixture of 258 parts of tetradecanedioic acid dihydrazide, 116 parts of hexamethylene diamine and 50 parts of urea. The content was heated to melt at 200° C. giving colorless transparent liquid. Then the melt mixture was heated to react at 200° C for 300 minutes in nitrogen stream, to gradually increase its viscosity, turning to hazy white in the latter half period until at last viscous translucent liquid was obtained. Then the liquid was allowed to react for another 300 minutes under vacuum of 1 mmHg to finish the reaction, yielding white mass of polymer in 250 parts.

To 1 kg. of POMD having 1.70 intrinsic viscosity there were added 1.0 percent of above-obtained product in powder from, 0.5 percent of 4,4'-butylidene-bis(3-methyl-6-tert-butyl-1-formyloxy-benzene) the formula

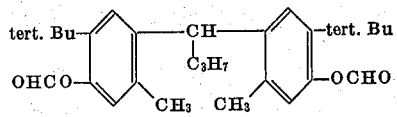

and 0.1 percent of cytidine.

The whole was completely kneaded and then formed at 190° C. by injection-molding into 3 mm. thick sample plates.

A portion of thus obtained sample plate was then heated in the air for 120 minutes at 222° C., resulting in a weight loss of 1.3 percent. The whiteness in terms of Z value was 99. Then in sample plate was crushed into powder and injection-molded into an equivalent sample plate. This reworking operation was repeated five times and neither discoloration nor degradation in properties was observed. Comparative test: The comparative test was conducted in the same manner as in Example 17, except that the components of the sample mixture were altered. A mixture of 1 kg. of POMD as identified above, 1.5 percent of copolyamide produced from hexamethylene adipamide, hexamethylene sebacamide and caprolactam, 0.5 percent of 4,4'-butylidene-bis(3-methyl-6-tert-butylphenol) and 0.1 percent of diphenylamine was used, giving a weight loss of 10 percent observed after heat treatment for 120 minutes at 222° C. The sample plate was observed to become dark brown.

A series of re-working operation of the sample plate in which the sample plate is crashed into powder and then injection-molded into the same shaped plate was conducted and the discoloration (light yellow) of the plate obtained on second re-working was observed.

EXAMPLE 18

(Stabilization of copolyacetal)

To 1 kg. of polyoxymethylene containing approximately 2.0 percent by weight of oxyethylene unit, was added 5 percent of 2,2'-methylene-bis(4-methyl-6-tert-butyl phenol). The whole mixture was divided into 4 equivalent portions, into each of which was incorporated an additive as specified in Table 2 to prepare sample composition. Each sample composition was throughly mixed and kneaded in a roll mill at 180° C and then formed into a 0.5 mm. thick sample sheet by means of a hot press. Each sample sheet was exposed to ultraviolet ray radiated from Fade-O-Meter and the yellowing of the sheet was observed as an indication of discoloration.

TABLE 2

| Sample Additives | Light-resistance[1] | K222[2] |
|---|---|---|
| (a) 0.08% of dicyandiamide | yellow | 0.03 |
| (b) 0.03% of maleinamide and 0.08% of dicyandiamine | yellow | 0.02 |
| (c) 0.05% of cytidine | not changed | 0.02 |
| (d) 0.05% of cytidine 0.05% of dicyandiamide | not changed | 0.02 |

[1]Light-resistance is indicated by appearance of a sample sheet observed after 192 hour exposure to the light.
[2]K222 is rate constant for thermal deterioration and is represented by a weight loss in terms of % of a sample sheet measured after heat treatment thereof at 222°C for 1 min.

EXAMPLE 19

(Stabilization of polyurethane)

A three-necked 1 l. flask was charged with 100 g. of hydroxyl-terminated low molecular weight glycol prepared by the reaction between polytetramethylene oxide diglycol having molecular weight of approximately 1,000 and 2,4-toluylenediisocyanate and 16.8 g of methylene-bis(4-phenyl isocyanate). The mixture was heated to react at 95° C. for 1 hour to give prepolymer, which was then dissolved in methylene chloride together with 13.9 g. of methylene bis(4-phenylisocyanate). To the solution was added a smaller amount of ethylene diamine to precipitate produced polyurethane.

Thus obtained polyurethane was then well washed with methanol and dried.

To 1 kg. of thus obtained polyurethane, there was added an additive as specified in Table 3. Each mixture was compression-molded at 200° C. under the pressure of 20 kg./cm² into a 3 mm. thick sample sheet. The sample sheet is exposed to ultraviolet ray by means of Fade-O-Meter at 55° C for 25 hours.

Then, the tensile strength of the sample sheet was measured with a tensile testing machine.

Endurable strength (%) of the sample sheet defined by the formula.

$$\frac{\text{Tensile strength of the sample sheet exposed to U.V. ray}}{\text{Tensile strength of the sample sheet unexposed to U.V. ray}} \times 100$$

and the discoloration of the sample sheet were measured as indications of light resistance of the sample.

While a cut-off portion of the same sheet was maintained at 150° C in the air for 6 hours and the endurable stability defined by the formula;

$$\frac{\text{Tensile strength of the sample heat-treated}}{\text{Tensile strength of the untreated sample}} \times 100$$

and the discoloration of the portion were measured as indications of thermal stability of the sample.

The results are tabulated in Table 3.

TABLE 3

| Sample Additives | Light resistance Endurable stability[1] (%) | discoloration[2] | Thermal stability Endurable stability[1] (%) | discoloration[2] |
|---|---|---|---|---|
| a No additives | 20 | brown | 67 | yellow |
| b Cytidine | 87 | not changed | 92 | not changed |
| c Uridine | 84 | slightly discolored | 90 | scarcely discolored |
| d 1,1,3-tris-(2-methyl-4-hydroxy-5-tert-dibutyl phenyl) butane (on sale) (comparative test) | 58 | yellow | 80 | slightly yellow |

Note: Discoloration was observed in the same manner as in the previous Example.

EXAMPLE 20

(Stabilization of polyamide)

To 1 kg. of Nylon-6 chips having $\eta rel.=3.0$, 0.5 percent of an additive as specified in Table 4 was added. The whole was thoroughly mixed, then extruded through a 20 mm. $\phi$ extruder into 50 denier sample filaments. Sample filament was subjected to aging by keeping it at 200° C in the air for 1 hour. The strength and the elongation of the sample filament before and after aging was measured, and the appearance of the sample filament was observed with naked eyes.

TABLE 4

| Sample Additives | Tensile strength (kg./cm².) before aging | after aging | Elongation (%) before aging | after aging | Light resistance (Appearance) |
|---|---|---|---|---|---|
| a No additives | 960 | 610 | 320 | 18 | slightly yellow |
| b α-naphthyl amine | 970 | 850 | 350 | 303 | brown |
| c N,N'-diphenyl paraphenylene diamine | 920 | 890 | 360 | 360 | dark brown |
| d Cytidine | 945 | 920 | 381 | 326 | nearly colorless |
| e Uridine | 936 | 912 | 352 | 320 | - do - |

EXAMPLE 21

(Stabilization of polypropyrene)

To 100 g. of polypropylene, there was added 0.25 percent of additive as specified in Table 5. The whole was well mixed and compression-moulded at 215° C. into 0.5 mm. thick sample sheets.

A test piece cut out from the sample sheet was exposed to U.V. ray irradiated from Fade-O-meter. During such irradiating operation, bending of the test piece was conducted every 2 hours and the time duration from the beginning of the irradiating operation until the test piece is broken was measured as brittling time which indicates light-resistance of the sample sheet.

Another test piece cut out from the sample sheet was kept at 140° C. in the air, during which the bending of the test piece was conducted every 2 hours.

The time duration was similarly measured as brittling time which indicates thermal stability of the sample sheet.

TABLE 5

| Sample | Additives | Brittling time[1] (hour) | Brittling time[2] (hour) |
|---|---|---|---|
| a | No additives | 40 | 2.5 |
| b | Cytidine | 200 | 240 |
| c | Uridine | 220 | 236 |
| b | Cytosine | 170 | 102 |
| e | Thymidine | 195 | 120 |
| f | 1,1-bis(2-methyl-4-hydroxy-5-tert-butylphenyl) butane | 600 | 5 |

Note:
[1] Brittling time was measured for the sample sheet exposed to U.V. ray.
[2] Brittling time was measured for the sample sheet aged by heat-treatment.

EXAMPLE 22

(Stabilization of polybutadiene)

As degradation inhibitor for synthetic rubber, well known are aromatic diamines, phenol derivatives, benzimidazoles, nickel dithiocarbomate and substituted phosphites. None of them affording satisfactory degradation inhibiting effect, superior degradation inhibitors or stabilizers are longed for. The effect of the pyrimidine bases of the present invention to inhibit degradation by ozone and heat is well justified by the results of following tests.

A mixture of 100 parts of synthetic rubber as specified in Table 6, 0.8 part of N-cyclohexyl-2-benzothiazole-sulfenamide as a vulcanization-accelerator, 5 parts of zinc flower, 2.5 parts of sulfur, 2 parts of stearic acid and 2 parts of stabilizer as specified in Table 6 was press-vulcanized at 145° C. for 15 min. to form a sample.

The sample was exposed to ozone in an Ozone-Weather-Meter in which the concentration of ozone was kept at 50 ppm, and the cracking of the sample was observed. While, a portion of the sample was maintained at 90° C. in the air for 36 hours to measure thermal degradation, which is defined by the formula:

$$\frac{\text{Endurable strength of the sample after heat-treatment}}{\text{Endurable strength of the untreated sample}}$$

with thermal degradation of the sample not containing a stabilizing agent taken to 1 as a reference. The results are shown in Table 6.

TABLE 6

| Sample No. | synthetic rubber | Additives | Ozone degradation 1(hr.) | 3(hr.) | 5(hr.) | Thermal degradation inhibiting effect |
|---|---|---|---|---|---|---|
| 1 | SBR (styrene-butadiene copolymer) | No additives | +[3] | —[5] | ——[6] | 1 |
| 2 | | $B_1$[1] | ++[4] | ++ | + | 1.6 |
| 3 | | $B_2$[2] | ++ | + | — | 2.5 |
| 4 | | Cytidine | ++ | ++ | ++ | 3.3 |
| 5 | | Uridine | ++ | ++ | ++ | 3.1 |
| 6 | | Cytosine | ++ | ++ | ++ | 2.9 |
| 7 | | Thymine | ++ | ++ | ++ | 2.8 |
| 8 | Cis-polybutadiene | No additives | + | — | — | 1 |
| 9 | | $B_1$ | ++ | ++ | + | 1.3 |
| 10 | | $B_2$ | ++ | + | + | 2.3 |
| 11 | | cytidine | ++ | ++ | + | 3.5 |
| 12 | | uridine | ++ | ++ | + | 3.2 |
| 13 | | cytosine | ++ | ++ | + | 2.7 |

Note: [1]$B_1$ is ozone degradation inhibitor, 6-ethoxy-2,2,4-trimethyl-1,2-dihydroquinoline sold under the trade mark "NOCRACKAW".
[2]$B_2$ is thermal degradation inhibitor, N-phenylene-N-isopropyl-p-phenylene diamine sold under the trademark Nocrack 810NA.
[3]+ Very small cracks were observed.
[4]++ No cracks were observed.
[5]— Small cracks were observed.
[6]—— Large cracks were observed.

EXAMPLE 23

To 1 kg. of vinylidene chloride 80 : vinyl chloride 20 copolymer (viscosity 1 c.p.s., measured at 120° C for 1 percent by weight solution of the copolymer in orthodichlorobenzene), there were added 5 percent of tertiary-butyl-phenylsalicylate, 3 percent of di-N-butyl-tin-dilaurate and 1 percent of cytidine. The whole mixture was throughly mixed in a mortar, and then extruded with a small extruder at cylinder temperature of 175° C.

In the course of extruding operation, decomposition of vinylidene chloride, discoloration of strands, slabs and surface-coarsening of strands were not observed. Sample not containing cytidene was excluded into the strands, which turned to light brown and there was a weak smell of hydrogen chloride gas near the spinnerets.

EXAMPLE 24

(Stabilization of polyester)

A 2 l. autoclave was charged with 1 kg. of polyethylene terephthalate (reduced viscosity: 0.97, measured at 60° C. for 0.5 percent by weight solution of the polymer in a mixture solution of equivalent amount of tetrachloroethane and m-cresol) and 0.3 percent of cytidine. The mixture was heated at 280° C. Then, the content was extruded from the bottom of the autoclave with the pressure of nitrogen stream into a colorless and transparent strand of 1 mm. diameter. Thus obtained sample strand was heated at 205° C. in the air for 100 hours, exhibiting no discoloration. The viscosity of the sample strand was $\eta$rel = 0.95.

Another reference sample was prepared in the same manner as above except that cytidine was not added, with a result that the strand finally became discolored like a straw.

The relative viscosity of the strand after heat-treatment was decreased to 0.75.

EXAMPLE 25

(Stabilization of polyacetal)

Into a 20 l. autoclave were charged 9 mols of $\epsilon$-caprolactam and 1 mol of $\epsilon$-caprolactone.

Nitrogen stream was slowly introduced into the autoclave and the mixture was heated at 80° C. Then, 0.3 mol of methyl magnesium bromide and 0.3 mol of N-acetyl caprolactam was added to the mixture and the whole mixture was stirred for 15 minutes.

Then 40 mols of toluene was added to the mixture and the whole was heated to react at 110° C. for 5 hours, giving polymer powder, which was washed with 40 l. of 1 percent hydrochloric acid, and then with pure water until the washing water became neutral, and dried under vacuo, at 60° C.

There was obtained polyester amide constituted of $\epsilon$-caprolactam 9: $\epsilon$-caprolactone 1.

A double-cone blender was charged with 1 kg. of polyoxymethylene diacetate (intrinsic viscosity: 1.92), 1.5 percent of above-obtained polyester-amide powder. 0.5 percent of 4,4'-butylidene-bis(3-methyl-6-tert-butyl-1-formyloxy-benzene) and 0.1 percent of a compound as specified in Table 7. The mixture was mixed and pelletized with a small extruder at a cylinder temperature of 190° C. The pellets were formed into a 3 mm. thick plate at a cylinder temperature of 190° C. and mould temperature of 85° C under the extruding pressure of 1,100 kg./cm².

The properties of the plate was measured and shown in Table 7.

TABLE 7

| Sample | Additives | R (%) | Z value | Appearance[1] |
|---|---|---|---|---|
| a | 6-hydroxy cytosine | 99.21 | 99 | no change |
| b | 6-amino cytosine | 99.20 | 99 | - do - |
| c | 6-heptadecaalkyl uracil | 98.93 | 99 | - do - |
| d | 1-N-dodecaalkyl uracil | 99.34 | 99 | - do - |
| e | 5-methyl cytosine | 98.78 | 98 | - do - |
| f | 5-methyl uracil | 99.02 | 99 | - do - |
| g | 1-ethyl-5-methyl uracil | 99.11 | 99 | not changed |

EXAMPLE 26

A three-necked flask was charged with 0.6 mol of sebacic acid dihydrazide, 1.0 mol of hexamethylene diamine and 1.5 mol of urea, which were then heated to melt and react at 205° C. with stirring in nitrogen stream for 200 minutes.

There was formed colorless transparent liquid which gradually turned viscous and at last it became hazy white. Then the reaction system was vacuumed to 1 mm Hg. where the reactant was kept for 300 minutes to complete the reaction, yielding colorless transparent polymer mass in 145 g. This mass could be formed into a clear thin film at 160° C by means of a laboratory press.

To polyoxymethylene diacetate (intrinsic viscosity: 1.82) were added 0.9 percent of above-obtained polymer in powder form, 0.4 percent of 1,1,3-tris (2-methyl-4-hydroxy-5-tert-butylphenyl) butane and 0.1 percent of an additive as shown in Table 8.

The whole mixture was extluded at a cylinder temperature of 190°C. into pellets, which were then injected into a mould maintained at 70° C. with injecting pressure of 900 kg./cm². A 3 mm. thick sample plate was injection-molded.

A test piece of this sample plate was heated at 222° C in the air for 90 minutes and the weight loss of the piece was measured.

Whiteness in terms of Z value of another piece of the sample plate was measured.

Another test piece of the sample plate was exposed to U.V. ray irradiated from Fade-O-Meter and the appearance of the test piece was observed as an indication of light resistance. The results are shown in Table 8.

TABLE 8

| ple | Additives | (1) R (%) | (2) Z value | Appearance After 48 hours | after 96 hours | after 192 hours |
|---|---|---|---|---|---|---|
| a | Cytidine | 99.3 | 99 | not changed | not changed | not changed |
| b | 5-amino cytidine | 98.7 | 99 | - do - | Yellow | Yellow |
| c | Uridine | 99.1 | 99 | - do - | not changed | not changed |
| d | 5,6-diamino uridine | 98.3 | 99 | - do - | Yellow | Yellow |

Note:
(1) R(%) is as defined in Table 1.
(2) Z value is as defined in Table 1.

What is claimed is:

1. Stabilized polymer composition which comprises (1) polymer material selected from the group consisting of polyolefines, polydiolefines, polyurethanes, polyhaloolefines, polyacetals and their copolymers (2) 0.001 – 10 percent by weight based on polymer material of at least one pyrimidine base of the general formula

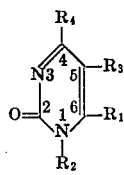

wherein $R_1$ is a member selected from the group consisting of hydrogen atom, hydroxyl, alkyl of one to 18 carbon atoms; $R_2$ is a member selected from the group consisting of monosaccharide of five to six membered ring such as

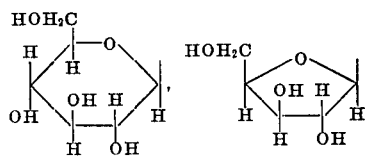

and

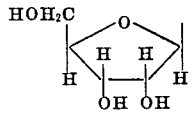

and alkyl or acetyl-substituted monosaccharide of five to six membered ring; $R_3$ is a member selected from the group consisting of hydrogen atom, alkyl of one to 18 carbon atoms; and $R_4$ is a member selected from the group consisting of amino and hydroxyl, and (3) at least one nitrogen containing compound selected from the group consisting of polyamide copolymers, polyesteramides, dicarboxylic acid dihydrazide-urea-diamine condensates and dicyandiamide.

2. Stabilized polymer composition as Claimed in claim 1, in which said polymer material is polyoxymethylene diacetate, polyoxymethylene diether or copolyoxymethylene.

3. Stabilized polymer composition as claimed in claim 1, in which said composition further contains stabilizing amounts of at least one phenolic antioxidant.

4. Stabilized polymer composition as claimed in claim 1, in which said pyrimidine base is present in an amount ranging from 0.01 to 5 percent by weight based on said polymer material.

5. Stabilized polymer composition as claimed in claim 1, in which said polymer material is polyoxymethylene diacetate.

6. Stabilized polymer composition as claimed in claim 1, in which said pyrimidine base is cytidine.

7. Stabilized polymer composition as claimed in claim 1, in which said pyrimidine base is uridine.

8. Stabilized polymer composition as claimed in claim 1, in which said pyrimidine base is cytidine and said composition additionally contains 0.001 – 10 percent by weight based on said polymer material of hexamethyleneadipamide-hexamethylene sebacamide-caprolactam-copolyamide.

9. Stabilized polymer composition as claimed in claim 1, in which said pyrimidine base is cytidine and said composition additionally contains 0.001 – 10 percent by weight based on said polymer material of polyaminotriazole prepared from sebacic acid hydrazide.

10. Stabilized polymer composition as claimed in claim 1, in which said pyrimidine base is cytidine and said composition additionally contains 0.001 – 10 percent by weight based on said polymer material of urea-adipic acid dihydrazide-hexamethylenediamine-condensate.

11. Stabilized polymer composition as claimed in claim 1, in which said pyrimidine base is uridine and said composition additionally contains 0.001 – 10 percent by weight based on said polymer material of urea-adipic acid dihydrazide-hexamethylenediamine-condensate.

12. Stabilized polymer composition as claimed in claim 1, in which said pyrimidine base is cytidine and said composition additionally contains 0.001 – 10 percent by weight based on said polymer material of dicyandiamide.

13. Stabilized polymer composition which comprises (1) polyamides or polyesters, (2) 0.001 – 10 percent by weight based on polymer material of at least one pyrimidine base of the general formula

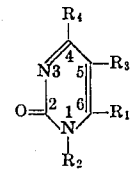

wherein $R_1$ is a member selected from the group consisting of hydrogen atom, hydroxyl, alkyl of one to 18 carbon atoms; $R_2$ is a member selected from the group consisting of monosaccharide of five to six membered ring such as

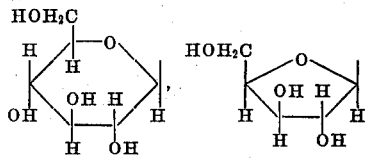

and

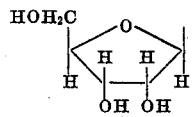

and alkyl or acetyl-substituted monosaccharide of five to six membered ring; $R_3$ is a member selected from the group consisting of hydrogen atom, alkyl of one to 18 carbon atoms; and $R_4$ is a member selected from the group consisting of amino and hydroxyl, and (3) at least one nitrogen containing compound selected from the group consisting of dicarboxylic acid dihydrazide-urea-diamine condensates and dicyandiamide.

14. Stabilized polymer composition as claimed in claim 13, in which said composition further contains stabilizing amounts of at least one phenolic anti-oxidant.

* * * * *